Nov. 23, 1965 R. H. LUEBBE, JR 3,219,818

THERMOGRAPHIC RECORDING PROCESS

Filed Oct. 5, 1962

*INVENTOR*
RAY HENRY LUEBBE, JR.

BY *Lynn Barratt Morris*

*ATTORNEY*

United States Patent Office 3,219,818

Patented Nov. 23, 1965

3,219,818

THERMOGRAPHIC RECORDING PROCESS

Ray Henry Luebbe, Jr., Fairhaven, N.J., assignor to E. I. du Pont de Nemours and Company, Wilmington, Del., a corporation of Delaware Filed Oct. 5, 1962, Ser. No. 228,731
9 Claims. (Cl. 250—65)

Figure 1:
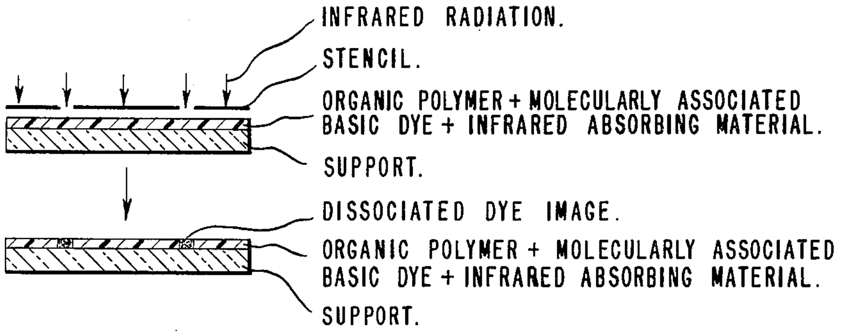

This invention relates to recording processes and elements. More particularly, it relates to processes of image reproduction and to elements useful in such processes.

Heat-sensitive papers for use in a thermographic apparatus that give copies of certain graphic originals quickly and easily by a completely dry process, are commercially available. However, the papers, which change color through thermally induced merging of two or more components, are inherently unstable because of slow diffusion of the two components at ordinary temperatures and faster diffusion at somewhat elevated temperatures.

An object of this invention is to provide a heat-sensitive element which is capable of forming rapidly, by a dry thermographic process, an image having a high resolving power. A further object is to provide an element capable of forming an image of any desired color, having improved appearance and good legibility. A still further object is to provide an element which is thermally stable (or which can be thermally stabilized) after the initial image has been formed and which has good handling characteristics. An additional object is to provide an element capable of forming an image of very high contrast. Still other objects will be apparent from the following description of the invention.

According to the present invention, the process comprises exposing, thermographically, at a temperature of at least 140° F., selected areas of a uniform layer comprising:

(1) a macromolecular organic polymer solid at 100° F. having intimately dispersed therethrough (2) at least one basic dye in molecularly associated form that becomes molecularly dissociated upon heating to a temperature of at least 140° F. to the extent that the extinction coefficient of the dye increases by at least 50% in one of the wavelength regions of intense dye absorption. The image-forming layer may also contain (3) an ethylenically unsaturated compound having at least one terminal ethylenic group and being capable of forming a high polymer by photoinitiated addition polymerization and (4) an addition polymerization initiator activatable by actinic light and, if desired, (5) a thermal addition polymerization inhibitor.

In addition to constituents (1) and (2), and any desired other constituents, the image-forming layer may contain (6) a finely divided or dispersed material, e.g., a compound or mixture of compounds which strongly absorb infrared radiation and thereby cause an increase in temperature in the areas of the element that are exposed to such radiation. The infrared absorbing material need not be in the layer but it can be in thermal contact with the image-forming layer. This can be accomplished by over- or under-coating the absorbing layer or by physically bringing a separate sheet into contact with the element at the time of exposure as in Cohen & Holland U.S. application Ser. No. 830,375 (U.S. Patent 3,073,953, Jan. 15, 1963). Infrared absorbing materials can be used advantageously in the coatings for reflex exposure as well.

In practicing the invention, a reflex thermographic exposure is especially useful where office copies are made. By using reflex exposure, copies can be made from materials having messages on both sides of a page or from opaque supports, e.g., paper, cardboard, metal, etc. A suitable process for carrying out the thermal exposure step is disclosed in C. S. Miller, U.S. Patent 2,740,896, issued April 3, 1956, in which process one can use a commercial "Thermo-Fax" (Minnesota Mining and Manufacturing Co.) thermographic copying machine.

An alternate method of providing the thermal exposure is disclosed in assignee's copending Cohen & Holland application, Ser. No. 830,375, filed July 29, 1959 (U.S. Patent 3,073,953). In said application, there is disclosed a process involving exposure by transmitted radiation (rather than reflectographic exposure) in which a negative of the original image is obtained. The process of said application is versatile in that it can make either "contact" reproductions or reproductions which are enlarged or reduced from the size of the original by projection printing through a lens system.

Figure 2:
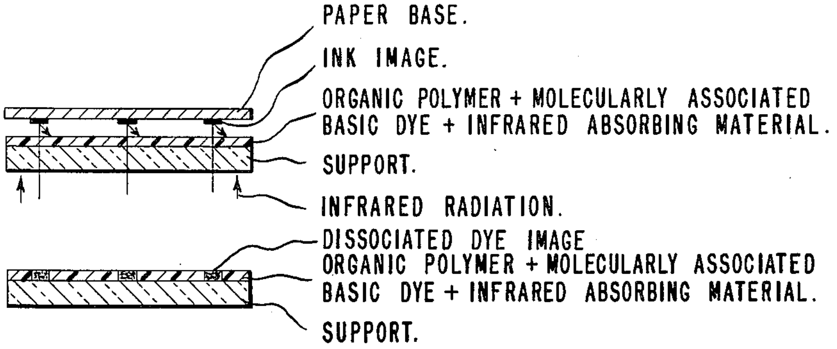

In the drawing that forms a part of this application, the exposure of the element described above containing a dye and infrared-absorbing material are shown in the form of flow diagrams with legends in which:

FIG. 1 shows exposure of the element through an image-bearing stencil and the resulting dye-image bearing element, and FIG. 2 shows reflectographic exposure of such an element to paper having ink images, and the resulting element.

The efficiency of the process may be greatly increased if it receives an overall heating in other ways, e.g., by passing over heated rolls prior to or during exposure, so that less imagewise heating is required to produce an adequate exposure. This procedure, known as "heat biasing," is useful in increasing sensitivity of the element for various types of subsequent exposure, e.g., reflectographic, exposure by transmitted light, or even exposure to hot type.

The process may be adapted for thermographic oscillographic recording, whereby a moving spot of infrared radiation impinges on a thermally sensitive element by reflection from a movable mirror. Also, the thermographic element can be contacted with a heated stylus, operated manually or mechanically, as a recording or copy arm of a sensing system driven by a photoelectric scanning beam. An electron beam can also be used as the source of imagewise heating. In a similar fashion, heated type characters, slugs or complete composed plates may be pressed directly in contact with the thermographic element.

The novel image-forming elements useful in accordance with this invention comprise a support and a solid layer comprising:

(1) a thermoplastic macromolecular organic polymer solid at 100° F. having intimately dispersed therethrough (2) at least one basic dye in molecularly associated form that becomes molecularly dissociated upon heating to a temperature of at least 140° F. to the extent that the extinction coefficient of the dye increases by at least 50% in one of the wavelength regions of intense dye absorption. These elements may also contain constituent (6) that is referred to above.

In preferred elements, the image-forming layr comprises a thermoplastic polymeric compound, such as a polymeric alkyl methacrylate, and a molecularly associated dye. A simple composition consisting of only these two ingredients may be coated on a suitable support, e.g., paper or a polymeric film such as a polyethylene terephthalate film base and the resulting element is capable of recording an essentially permanent image or record. More preferred layers may contain additional ingredients such as plasticizers for the thermoplastic binder which serve to lower the amount of heat which is required to effect a molecular dissociation of the dye within the binder.

In practicing the processes of the invention, the image-forming layers preferably contain a polymerizable material and, normally, a photoinitiator so that a recorded image may be made permanent or "fixed," i.e., an imagewise molecular dissociation of the basic dye may be prevented from reverting to the molecularly associated form by polymerizing the polymerizable material in the composition.

Many of the variably absorbing dyes useful in accordance with this invention are disclosed in assignee's copending application, Cohen & Luebbe, Ser. No. 156,518 filed Dec. 1, 1961, now U.S. Patent No. 3,198,633. In this copending application, it is revealed that certain basic dyes may be imagewise transferred to the surface of a receptive support, e.g., bond paper, whereupon the dye undergoes an increase in extinction coefficient in a part of its intense visible spectrum. This increase in extinction coefficient of a dye is similar to the phenomenon of metachromasy in solution which is discussed in J. Am. Chem. Soc., 67, p. 1212 (1945).

The thermoplastic macromolecular organic polymer used in the process forms solid, smooth, coherent films and suitable polymers include cellulose derivatives and addition and condensation polymers of high molecular weight, i.e., above 10,000. Suitable such polymers are described in the Cohen & Luebbe U.S. application Ser. No. 156,518 (U.S. Patent 3,198,633, Aug. 3, 1965) and in Burg and Cohen, Belgian Patent No. 593,834, Feb. 6, 1961. Suitable polymers, including copolymers, are described below.

In assignee's copending application (U.S. Patent No. 3,198,633) referred to above, the metachromatic effect in solid elements involving molecular dissociation of the basic dyes is broadly disclosed. The present invention is specifically concerned with molecular dissociation as caused by thermal means. The invention is normally concerned with thermal, image-wise recording, although the compositions and elements of this invention can also be used in the absence of image-wise recording, e.g., as a thermal indicator for indication of an overall exposure to heat. A number of basic dyes are operable both in the thermal exposure processes wherein the compositions of the present inventions are useful and in the transfer processes disclosed in the copending application referred to above. Other dyes, however, may be useful in only one of these inventions. To be of a practical value, the basic dyes useful in the present invention must become molecularly dissociated on heating at a temperature of 140° F. or higher such that the extinction coefficient of the dye increases by at least 50% in one of the wavelength regions of intense dye absorption. Two or more such basic dyes may be used in combination to yield colors difficult to obtain with a single dye, e.g., a neutral or gray. Useful compositions may additionally contain dyes which do not exhibit the phenomenon of variation in extinction coefficient. Any of the elements disclosed in the Cohen & Luebbe application Ser. No. 156,518 (U.S.P. 3,198,633) can be used in the processes of this application.

The invention will be further illustrated by but is not intended to be limited to the following examples:

EXAMPLE I

To 11.3 g. of a 17.5% by weight acetone solution of ethyl cellulose containing 48% ethoxyl groups (which, in a 5% by weight solution in 80:20 toluene:ethanol, had a viscosity of 4.5 centipoises at 25° C.) there is decanted an ethanol solution containing 0.04 g. of Methylene Blue dye (CI Basic Blue 9—prepared by adding 0.04 g. of the solid dye to 3 ml. ethanol and bringing to a boil for about 1 second) and the solution is brought to a total weight of 20 g. with acetone. The solution is coated on biaxially oriented and heat set, 1-mil polyethylene terephthalate film and dried in air at room temperature.

Another coating is made in which the solution containing 0.04 g. of Methylene Blue is replaced by a similar solution containing 0.04 g. of the dye 3,3′-diethyl-5,5-dibromo-9-methyl thiocarbocyanine p-toluenesulfonate.

A third coating is prepared in a similar manner starting with an identical dye solution as that described in the paragraph above which is added to 11.3 g. of a 17.7% by weight solution of an isobutyl methacrylate polymer having, at 25° C., a density of 1.05, a refractive index of 1.477 and a tensile strength, ASTM D638–49T) of 3600. The solution is again brought to a total weight of 20 g. by addition of acetone and coated and dried as described above.

Three coatings have been described in the three paragraphs above and these coatings will be referred to, in order, as Coating No. 1, Coating No. 2, and Coating No. 3. It will be observed in all three of these coatings that no plasticizing compound is present.

Samples of these coatings are examined spectrophotometrically, by transmitted light using the Cary Recording Spectrophotometer, model 14MS, Ser. No. 14, manufactured by Applied Physics Corporation, Pasedena, California. Other samples of these same coatings are heated on a conventional electric hot plate to a temperature at which the polyethylene terephthalate film support is observed to shrivel. These samples which have been heated are also examined spectrophotometrically so that their absorption characteristics can be compared with the absorption characteristics of the samples which had not been heated. All three coatings exhibit an increase in optical density upon heating as can be seen from the table below:

*Table I*

| | Wave Length, millimicrons | Optical Density | |
|---|---|---|---|
| | | Heated | Unheated |
| Coating No. 1 | 630 | 0.52 | 0.24 |
| Coating No. 2 | 565 | 0.67 | 0.35 |
| Coating No. 3 | 580 | 0.35 | 0.24 |

It can be seen that the presence of a plasticizer is not necessary to observe an increase in efficiency of absorption on heating. Furthermore, in the absence of a plasticizer, the color shift is sometimes permanent and no special stabilization or "fixing" steps are required. Coatings such as these might find practical applications as thermal indicators.

EXAMPLE II

A stock binder solution is prepared by stirring at room temperature until dissolved:

| | | |
|---|---|---|
| Cellulose acetate butyrate | g. | 165 |
| Cellulose acetate | g. | 132 |
| Acetone | g. | 1430 |
| Methyl ethyl ketone | g. | 660 |

The cellulose acetate butyrate contains ca. 20.5% acetyl groups, ca. 26% butyryl and ca. 2.5% hydroxyl groups and has a viscosity of 9 to 13.5 poises as determined by A.S.T.M. method D1343 in solution described as Formula A, A.S.T.M. method D–871–54T. The cellulose acetate acetate has 39.4% acetyl groups and has an A.S.T.M. viscosity of 45.

The following ingredients are added in another contrainer and heated for 15 minutes on a steam bath.

| | | |
|---|---|---|
| Pentaerythritol triacrylate | g. | 17 |
| Solution (10% by weight) polyethylene glycol of molecular weight 4000 in methanol | ml. | 5 |
| Methanol | ml. | 10 |
| CI Basic Black 2 Dye | g. | 0.2 |

After heating the above mixture for 15 minutes on a steam bath, there are added 51 g. of the stock binder solution described above, 0.25 g. of phenanthrenequinone and acetone to bring the total weight to 115 g. The mixture is then stirred for 30 minutes at room temperature, and coated on 0.001 inch-thick polyethylene terephthalate film base so as to leave a dry coating thickness of 0.00035 inch.

The dried coating is exposed at the No. 3 setting of a "Premier Model 19 Thermo-Fax" (Minnesota Mining and Mfg. Co.) thermographic copying machine, the coating thereby receiving a reflex exposure from an original comprising a white sheet of paper with black ink letters printed thereon. This thermal exposure causes molecular dissociation of the dye in the image area which results in the appearance of a positive copy of the original message (dark blue-black letters against a lighter background). A 1-mil polyethylene terephthalate film was applied by means of a squeegee to the coating. A post exposure to a General Electric 30 watt white fluorescent lamp for 5 minutes fixes the image by polymerizing the monomer so as to prevent subsequent image fading.

EXAMPLE III

The following solution is prepared:

| | |
|---|---|
| Polyethylene glycol disacrylate ____g__ | 80 |
| Cellulose acetate butyrate ____g__ | 80 |
| Acetone ____g__ | 320 |

The above ingredients are mixed in a food and beverage blender (Waring Corporation, New York, N.Y.) for 10 minutes and then brought up to a weight of 535 g. with acetone. The cellulose acetate butyrate is the same as that described in Example II above and the polyethylene glycol diacrylate is derived from polyethylene glycol with an average molecular weight of 300. To 13.3 g. of the cellulose acetate butyrate/polyethylene glycol diacrylate solution prepared above, there are added 0.04 g. of phenanthrenequinone and 3 ml. of water-ethanol solution containing 0.1 g. of the dye, 3,3′-diethyl-5,5′-dibromo - 9 - methyl thiacarbocyannie p-toluenesulfonate. The solution is brought to a total weight of 20 g. with acetone, and is coated and dried on 0.001 inch polyethylene terephthalate film, giving a 0.004 inch thick polymerizable layer. The coating is laminated with another sheet of 0.001 inch thick polyethylene terephthalate film by pressing at room temperature with a rubber squeegee.

The coating is exposed at the #2 setting of a "Premier Model 19 Thermo-Fax" (Minnesota Mining and Manufacturing Co.) thermographic copying machine to produce a copy of a paper sheet on which letter characters were printed in black printing ink. A positive copy of the original image is thus obtained by the image-wise heating as described. The letter characters appear as a dark magenta color against a lighter magenta colored background. The image is then stabilized against reversible aggregation of the dye molecules by exposing for one minute to a carbon-arc lamp. No fading can be detected after exposure for 45 minutes at a distance of one inch by a 15-watt blue fluorescent lamp.

The coating is then delaminated and the exposure continued for 5 minutes. A rapid bleaching is observed, taking place to a greater degree in the areas of the coating of higher optical densities. The bleaching by light exposure is continued for about twenty minutes until the image reverses from a positive to a negative. This example illustrates the flexibility of such a coating whereby it is possible to obtain a thermographic copy which may be either a positive or a negative, if the photostability of the aggregated form of the dye is substantially greater than that of the deaggregated form.

A similar coating which contains no phenanthrenequinnone photoinitiator is exposed in a similar manner in the thermographic copying machine. Again, a positive copy resulted, very similar in appearance to the one described above. This copy, however, is not stabilized by subsequent photoexposure and the image is found to fade appreciably when left overnight.

EXAMPLE IV

A stock solution is prepared by stirring together at room temperature, until disolved, the following materials:

| | |
|---|---|
| Cellulose acetate, 10% by weight solution in 86% acetone, 14% methanol ____g__ | 60 |
| Cellulose acetate butyrate, 17.7% by weight solution in acetone ____g__ | 57 |
| Penetaerythritol triacrylate ____g__ | 18 |
| Triethylene glycol diacrylate ____g__ | 6 |

To 11.5 g. of the above stock solution there is added 0.04 g. phenanthrenequinone and a solution prepared by adding 0.04 g. of Thioflavine TCN dye (CI Basic Yellow 1) to 6 ml. of methanol. The dye solution is brought just to a boil, cooled and centrifuged for 5 minutes, using the clear solution obtained from the centrifuging step and discarding the residue. After adding the Thioflavine dye solution, the mixture is brought up to a total weight of 21 grams by the addition of acetone and is then coated on 0.001 inch thick polyethylene terephthalate film base. After drying in air at room temperature, there remains a coating stratum about 0.0003 inch in thickness.

The above coating is exposed reflectographically to an original comprising black letters printed on white paper, using the number 6 setting of the thermographic copying machine described above. The Thioflavine dye increases in density by molecular dissociation in the heated areas to yield to a positive copy of the original. However, the difference in density between the image areas and the non-image areas was not of high contrast as the dye image was yellow.

In order to increase the contrast, to provide a copy in a more desirable color, and thereby to produce an excellent copy of the original image, the copy produced as described above is used as an intermediate or "negative" for the exposure (by light) of another coating prepared as described below.

A dye solution is prepared by adding 0.04 g. of the solid dye, CI Acid Blue 59, to 6 ml. of methanol, bringing just to a boil, centrifuging 5 minutes and discarding the residue. This solution is added to 11.5 g. of the stock solution described above and the mixture brought to a total weight of 21 g. by the addition of acetone. After coating this composition on 0.001 inch think polyethylene terephthalate film base and drying in air, there results a coating 0.0003 inch thick on which there is laminated a 1-mil polyethylene terephthalate film.

An exposure by transmitted light is made by exposing this latter coating in a Rotolite Model #18 White Printing Machine (Rotolite Sales Corp., P.O. Box 7, Sterling, N.J.) equipped with a standard blue fluorescent lamp for 5 seconds at 110 volts. The exposure is made through the low contrast copy described earlier in this example, the copy having a yellow (Thioflavine) dye image. The yellow dye image modulates the blue exposing light so as to cause formation of a latent negative image in the second coating consisting of an image-wise polymerization of the monomeric component. The exposed element is then contacted with a sheet of bond paper and a positive image is thermally transferred to the bond paper by the thermal transfer process described in assignee's copending application, Burg & Cohen, Serial No. 831,700, filed Aug. 5, 1959 (U.S. Patent 3,060,023, Oct. 23, 1962). With the thermal transfer, there is a clear blue positive image on the bond paper caused by the transfer of unpolymerized material along with the blue dye dissolved therein in the unexposed areas of the coating. Thus the contrast of the original copy obtained by a thermographic exposure is amplified so as to produce a very pleasing copy.

EXAMPLE V

A 15% by weight stock solution is made up from 50 g. of polyvinyl acetate (having a viscosity of 750–1000 centipoises as a benzene solution containing 86 g. of polyvinyl acetate per 1000 cc. of solution at 20° C.), and 280 g. of acetone. Stirring is continued at room temperature until complete solution occurs, after which the total solution weight is adjusted to 330 g. by addition of acetone.

Another 15% by weight stock solution is prepared from 50 g. of N-methoxymethyl polyhexamethylene adipamide having an intrinsic viscosity of about 1 and having methoxymethyl groups on at least 45% of the amido nitrogen atoms and 280 g. of grade 3A denatured ethanol. The mixture is heated with stirring on a steam bath until complete solution occurs. After cooling, the solution is adjusted to a total weight of 330 g. by addition of more ethanol.

A solution is prepared from 0.04 g. of "Sevron" Orange G Dye (CI Basic Orange 21) and 5 ml. of methanol. The mixture is brought just to a boil, cooled and centrifuged for 5 min., the solid residue being discarded. This dye solution is added to a mixture comprising 2.0 g. of triethylene glycol diacrylate, 13.3 g. of the 15% stock solution of polyvinyl acetate prepared above and 0.04 g. of a photoinitiator, ethyl anthraquinone. The mixture is brought up to a weight of 20 g. with acetone, stirred well, coated on 0.001 inch thick polyethylene terephthalate film base and dried in air at room temperature so as to leave a dried coated stratum approximately 0.0003 inch in thickness.

In a similar manner, a dye solution is made up from 0.04 g. of Methylene Blue dye (CI Basic Blue 9) and 5 ml. of methanol. Again, the mixture is brought just to a boil, cooled, centrifuged 5 min. at room temperature and the solid residue discarded. This dye solution is added to a 30 g. bottle containing 2.0 g. of polyethylene glycol diacrylate (as described in Example III), 13.3 g. of the 15% by weight stock solution of the polyamide prepared above, 0.04 g. of the photoinitiator, benzoin methyl ether, and sufficient grade 3A denatured ethanol to bring the total solution weight to 20 g. After thorough stirring at room temperature, the mixture is coated in a similar manner to the coating just described.

After laminating with another sheet of 0.001 inch thick polyethylene terephthalate film, both of the above coatings are contacted with heated metal type characters in a composed plate, and in both cases the dyes become molecularly dissociated imagewise in such a manner as to produce a clear, right-reading image. In the case of the "Sevron" Orange dye-containing element the thermally exposed image is a dark orange against a light orange background. In the case of the Methylene Blue dye-containing element, the thermally exposed image is a dark blue against a light blue background.

EXAMPLE VI

A dye solution is prepared by adding 0.04 g. of Sevron Orange G (CI Basic Orange 21) dye to 3 ml. of ethanol, stirring 3 minutes, adding 3 ml. of water, heating the solution just to initial boiling, cooling the solution to room temperature, centrifuging it and discarding the precipitate.

The dye solution is added to 12.5 g. of a 10% by weight aqueous solution of a polyvinyl alcohol which is prepared from 86% to 89% hydrolyzed polyvinyl acetate and which, as a 4% by weight aqueous solution at 20° C., has a viscosity of 19–25 centipoises (determined by means of the Hoeppler falling ball method). Water is added to the dye/polyvinyl alcohol solution to bring the total weight up to 20 g. The solution is coated on 0.001 inch-thick polyethylene terephthalate film base so as to leave, after overnight drying, a coating 0.00035 inch thick.

A sample of the coating is tested by pressing onto a hot plate at a temperature of 150° C. (as determined by an iron-constantan thermocouple). Marked deaggregation of the orange dye, caused by the heating, is evident from the substantial darkening of the coating. The dye is in a non-thermoplastic binder and a thermally induced color change occurs.

In the above examples, the abbreviation "CI" refers to the Colour Index, second edition 1956, the Society of Dyers and Colourists, Dean House, Picadilly, Bradford, Yorkshire, England, and the American Assoc. of Textile Chemists and Colorists, Lowell Technological Institute, Lowell, Mass., U.S.A.

A number of materials suitable for use as the thermoplastic binder in the image-forming layers of this invention are given in assignee's copending application, Burg & Cohen S.N. 163,078 filed Dec. 29, 1961. These include thermoplastic polymers such as copolyesters, nylons, vinylidene chloride copolymers, cellulosic ethers, polyethylenes, synthetic rubbers, cellulose esters, polyvinyl esters, ethylene/vinyl acetate copolymers, polyacrylate and alpha-alkyl polyacrylate esters, etc. In conjunction with such thermoplastic polymers, it is frequently desirable to use a plasticizing agent such as a low molecular weight polyalkylene oxide, ether or ester or some other plasticizing agent such as disclosed in the above copending application. This same application also discloses a number of suitable addition polymerizable ethylenically unsaturated compounds and photoinitiators which, together, make it possible to stabilize a thermally-produced dye image, by a subsequent exposure to actinic radiation, so as to prevent molecular reassociation after the image is formed.

The thermoplastic composition is preferably coated on a base support. Suitable support materials are stable at the operating temperatures used in the instant invention. Suitable bases or supports are those disclosed in U.S. Patent 2,760,863, glass, cellulose esters, e.g., cellulose acetate, cellulose propionate, cellulose butyrate, etc., and other plastic compositions such as polyamides, polyesters, e.g., polyethylene terephthalate; polyethylene, polypropylene; biaxially oriented supports, i.e., polyethylene terephthalate and polypropylene, etc. The preferred supports should have surfaces which do not form strong association bonds with the dye, thereby preventing molecular association at lower temperatures. Thus ordinary paper and wood are not considered among the supports. Waxed or transparentized paper is satisfactory, however, as well as paper or wood which has a protective overcoating, e.g. of polyester or of aluminum. The support may have in or on its surface and beneath the heat sensitive layer, substrata needed to facilitate anchorage to the base.

Processes of the present invention are useful for a variety of copying, printing, decorative and manufacturing applications. Reflex exposures can be used for any of these applications provided the support material is capable of transmitting infra-red radiation, and is especially useful in copying from original messages on supports which may have low transmission of infra-red radiation.

The coating compositions of this invention can also be used to make variable density filter layers wherein optical density can be controlled by temperature. In the absence of fixation or stabilization, the process is reversible so that the dyes which are deaggregated upon heating to undergo an increase in their extinction coefficient will reaggregate upon cooling and undergo a decrease in extinction coefficient. Thus, the layers of the compositions can be used on glass and other transparent supports for greenhouses, homelighting, etc., wherein the infrared component of impinging radiation can be used to modulate the quantity and/or color of the light transmitted.

The instant process has the advantage that, by a simple procedure, involving the use of heat in a dry system, copies of the images which are of high quality and stability are obtained rapidly. Since there are a large number of dyes that are suitable for use in the process of this invention, it is possible to obtain images recorded in essentially any color which might be desired.

By proper selection of the thermoplastic binder, with or without the use of plasticizing agents, great latitude is possible in the selection of the temperature at which the thermographic color change will occur. This is of particular value in making elements useful as thermal indicators since the color change may be made to occur at any desired temperature or over any desired temperature range. Still other advantages will be apparent to those skilled in the art.

What is claimed is:

1. A process which comprises exposing imagewise, thermographically, at a temperature of at least 140° F. a solid, uniform layer, said layer having intimately and uniformly dispersed therethrough:

(1) a macromolecular organic polymer solid at 100° F., and (2) at least one basic dye in molecularly associated form that becomes molecularly dissociated physically upon heating to a temperature of at least 140° F. to the extent that the extinction coefficient of the dye increases by at least 50% in one of the wavelength regions of intense dye absorption;

to molecularly dissociate the dye physically in the imagewise exposed areas from the molecularly associated form to the molecularly dissociated form.

2. A process of image formation which comprises exposing imagewise, thermographically, at a temperature of at least 140° F. a solid, uniform image-forming layer, said layer having intimately and uniformly dispersed therethrough:

(1) a macromolecular thermoplastic organic polymer solid at 100° F.;

(2) at least one basic dye in molecularly associated form that becomes molecularly dissociated physically upon heating to a temperature of at least 140° F. to the extent that the extinction coefficient of the dye increases by at least 50% in one of the wavelength regions of intense dye absorption, (3) an ethylenically unsaturated compound having at least one terminal ethylenic group and being capable of forming a high polymer by photoinitiated addition polymerization, and (4) an addition polymerization initiator activatable by actinic light;

to molecularly dissociate the dye physically in the imagewise exposed areas from the molecularly associated form to the molecularly dissociated form.

3. A process of image formation which comprises:

(A) exposing imagewise, thermographically, at a temperature of at least 140° F. a solid, uniform layer, said layer having intimately and uniformly dispersed therethrough:

(1) a macromolcular thermoplastic organic polymer solid at 100° F.;

(2) at least one basic dye in molecularly associated form that becomes molecularly dissociated physically upon heating to a temperature of at least 140° F. to the extent that the extinction coefficient of the dye increases by at least 50% in one of the wavelength regions of intense dye absorption;

(3) an ethylenically unsaturated compound having at least one terminal ethylenic group and being capable of forming a high polymer by photoinitiated addition polymerization, and (4) an addition polymerization initiator activatable by actinic light; and (B) after completion of the thermographic exposure, exposing the layer of actinic light.

4. A process according to claim 3 wherein said polymer is a cellulose ether.

5. A process according to claim 3 wherein said layer contains a plasticizer for said polymer.

6. A process according to claim 3 wherein said polymer is a cellulose carboxyl acid ester.

7. A process according to claim 3 wherein said polymer is a polyalkyl acrylate.

8. A process according to claim 3 wherein said image-forming layer also contains at least one of the following components:

(5) a thermal polymerization inhibitor, and (6) finely divided material which strongly absorbs infrared radiation.

9. A process according to claim 3 wherein the thermographic exposure is a reflex exposure.

References Cited by the Examiner

UNITED STATES PATENTS

| | | | |
|---|---|---|---|
| 2,675,332 | 4/1952 | Green | 117—36.9 |
| 2,953,454 | 9/1960 | Berman | 117—36.8 |
| 3,060,024 | 10/1962 | Burg et al. | 117—1.7 |
| 3,060,025 | 10/1962 | Burg et al. | 117—1.7 |
| 3,073,953 | 1/1963 | Cohen et al. | 117—36.8 |
| 3,076,721 | 2/1963 | Coles et al. | 117—36.8 |
| 3,094,417 | 6/1963 | Workman | 117—36.2 |
| 3,094,619 | 6/1963 | Grant | 117—36.8 |
| 3,100,702 | 8/1963 | Rauner et al. | 117—36.1 |
| 3,108,893 | 10/1963 | Owen | 117—36.2 |

WILLIAM D. MARTIN, *Primary Examiner.*

MURRAY KATZ, *Examiner.*